(12) United States Patent
Tanaka et al.

(10) Patent No.: US 10,503,336 B2
(45) Date of Patent: Dec. 10, 2019

(54) DEVICE AND METHOD FOR TOUCH SENSING ON DISPLAY PANEL

(71) Applicant: Synaptics Japan GK, Nakano, Tokyo (JP)

(72) Inventors: Nobukazu Tanaka, Tokyo (JP); Takayuki Noto, Tokyo (JP); Yoshitaka Iwasaki, Tokyo (JP)

(73) Assignee: Synaptics Japan GK, Tokyo (JP)

(*) Notice: Subject to any disclaimer, the term of this patent is extended or adjusted under 35 U.S.C. 154(b) by 0 days.

(21) Appl. No.: 15/961,578

(22) Filed: Apr. 24, 2018

(65) Prior Publication Data

US 2018/0329536 A1 Nov. 15, 2018

(30) Foreign Application Priority Data

Apr. 28, 2017 (JP) .................................. 2017-90182

(51) Int. Cl.
*G06F 3/044* (2006.01)
*G09G 3/36* (2006.01)
*G06F 3/041* (2006.01)

(52) U.S. Cl.
CPC ............ *G06F 3/044* (2013.01); *G06F 3/0412* (2013.01); *G06F 3/0416* (2013.01); *G09G 3/3614* (2013.01); *G09G 3/3688* (2013.01); *G09G 3/3696* (2013.01); *G09G 2354/00* (2013.01)

(58) Field of Classification Search
CPC ...... G06F 3/044; G06F 3/0412; G06F 3/0416; G09G 3/3614; G09G 3/3688; G09G 3/3696; G09G 2354/00
See application file for complete search history.

(56) References Cited

U.S. PATENT DOCUMENTS

| | | | |
|---|---|---|---|
| 2011/0157070 A1* | 6/2011 | Martin | G06F 3/0416 345/174 |
| 2011/0234561 A1* | 9/2011 | Tzeng | G09G 3/3614 345/209 |
| 2016/0209950 A1* | 7/2016 | Kim | G06F 3/044 |
| 2016/0291785 A1* | 10/2016 | Mizuhashi | G06F 3/0416 |

FOREIGN PATENT DOCUMENTS

JP 2015141556 A 8/2015

* cited by examiner

*Primary Examiner* — Stephen G Sherman
(74) *Attorney, Agent, or Firm* — Patterson + Sheridan, LLP

(57) ABSTRACT

A semiconductor device includes an analog front end and processing circuitry. The analog front end is configured to obtain capacitance detection data depending on capacitances of a plurality of sense electrodes of a liquid crystal display panel. The processing circuitry is configured to generate touch sensing data associated with a current touch sensing frame, based on capacitance detection data associated with the current touch sensing frame and capacitance detection data associated with a former touch sensing frame selected in response to a state in which the liquid crystal display panel is placed in the current touch sensing frame.

20 Claims, 10 Drawing Sheets

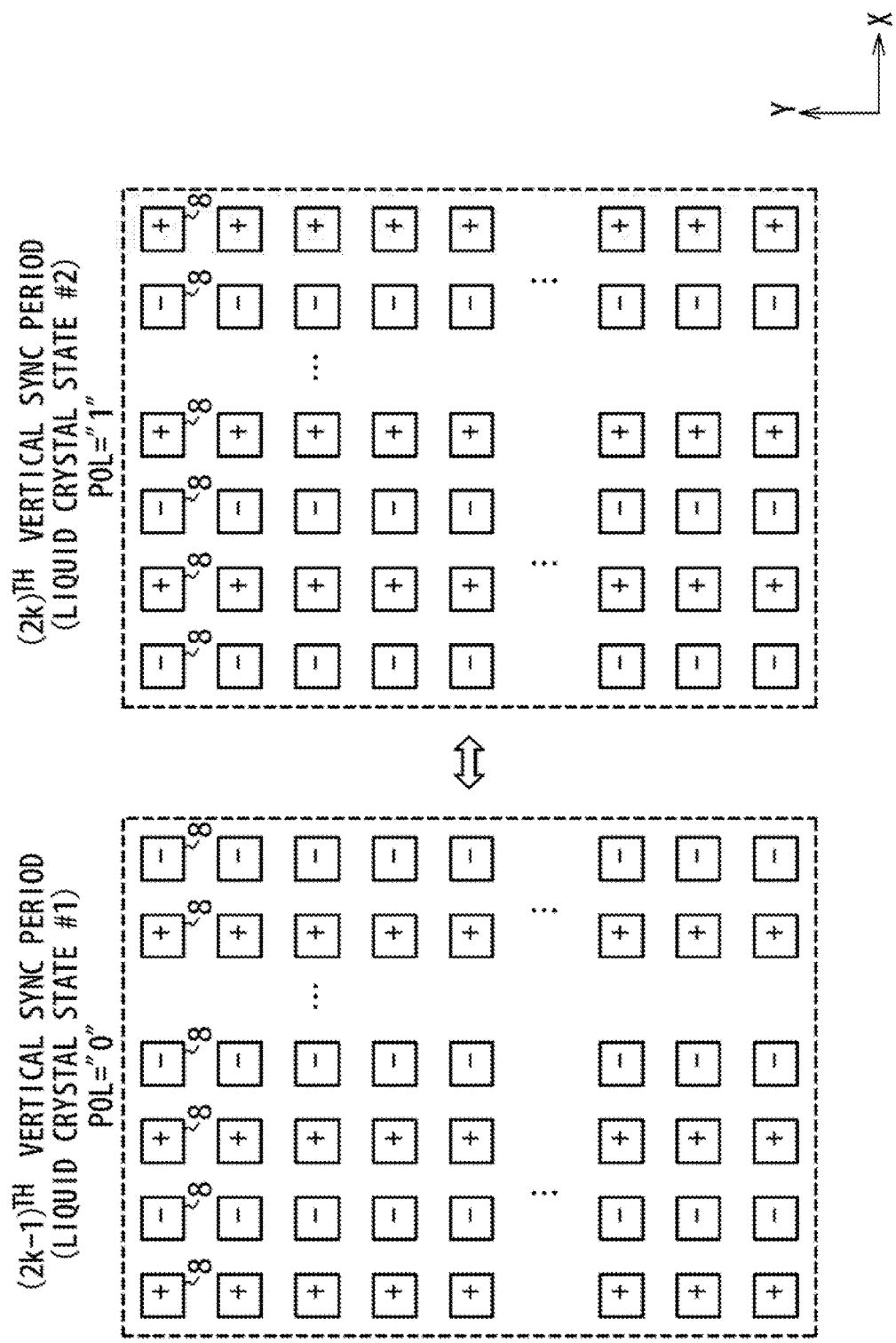

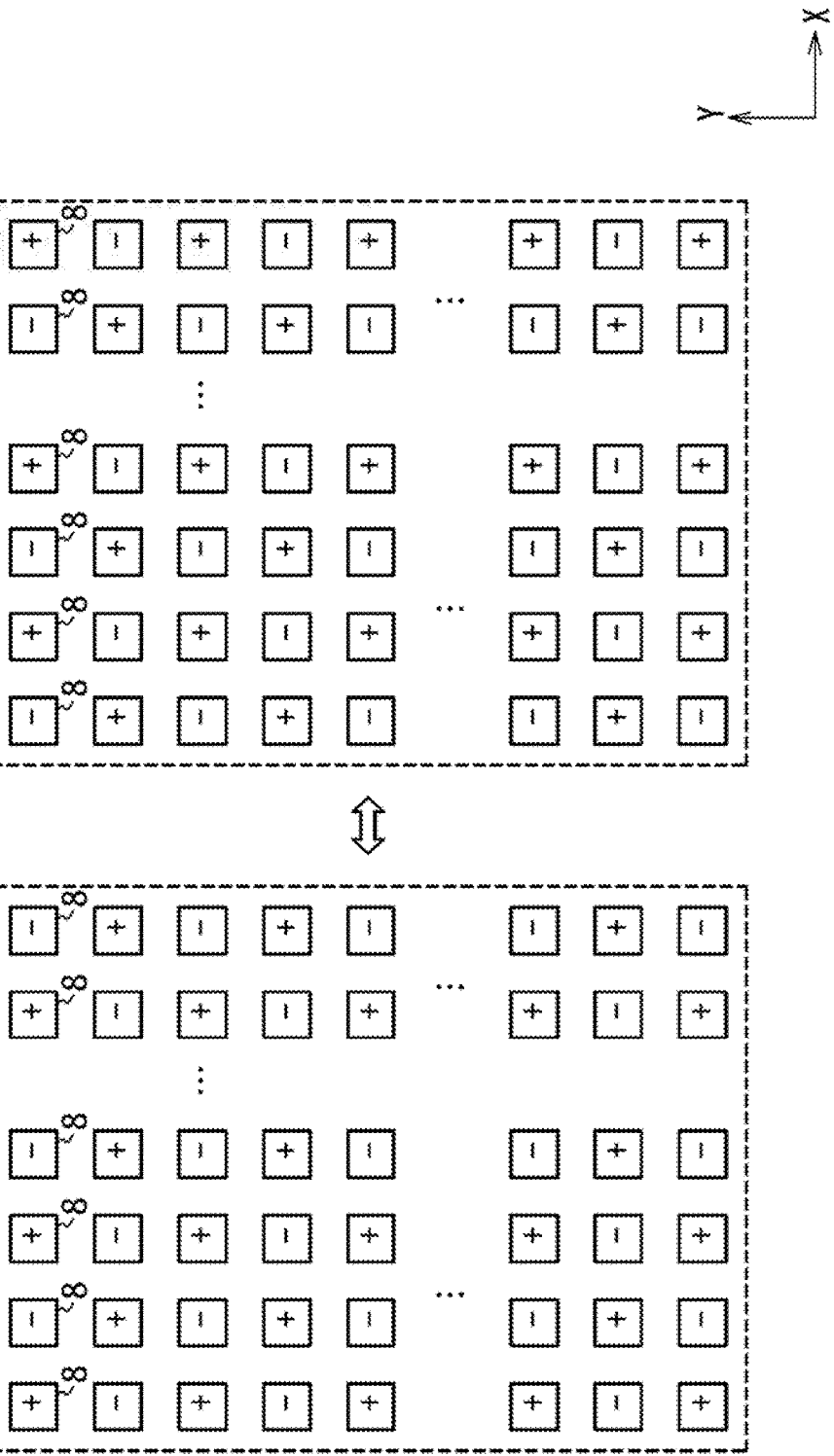

DEVICE AND METHOD FOR TOUCH SENSING ON DISPLAY PANEL

CROSS REFERENCE

This application claims priority to Japanese Patent Application No. 2017-90182, filed on Apr. 28, 2017, the disclosure of which is incorporated herein by reference in its entirety.

TECHNICAL FIELD

The present disclosure relates to a device and method for touch sensing on a display panel.

BACKGROUND

A display device incorporating a display panel configured to display an image and a touch panel adapted for touch sensing to detect user input provides a convenient user interface.

Capacitive sensing is one type of touch sensing technologies. Some capacitive sensing technologies may be based on self-capacitance (also referred to as "absolute capacitance") sensing and/or mutual capacitance (also referred to as "transcapacitance") sensing. The self-capacitance sensing involves obtaining a sensing signal dependent on the self-capacitance of a sense electrode provided in the touch panel while the mutual capacitance sensing involves obtaining a sensing signal dependent on the mutual capacitance between a sense electrode and a drive electrode. Capacitive touch sensing is disclosed in Japanese Patent Application Publication No. 2015-141556.

A liquid crystal display ("LCD") panel incorporating electrodes used for touch sensing, which may include sense electrodes and/or drive electrodes, may effectively reduce the volume of the entire display device and may be suitable for application to mobile terminals.

A sensing signal obtained from a sense electrode may be influenced by the state of the LCD panel. For example, inversion drive, which is performed to avoid "burn-in" of the LCD panel, may influence the sensing signal obtained from a sense electrode. The inversion drive involves inverting drive voltages written into respective pixel circuits of the LCD panel, and this causes large changes in the potential distribution around each sense electrode. The changes in the potential distribution around a sense electrode may influence the sensing signal obtained from the sense electrode. The influence of the inversion drive on the sensing signal may appear as generation of an offset in the sensing signal and may cause deterioration in the SNR (signal-to-noise ratio) of the sensing signal.

Accordingly, there is a need for providing a touch sensing technology which reduces an influence of the state of the liquid crystal display panel on the sensing signal.

SUMMARY

In one embodiment, a semiconductor device comprises an analog front end configured to obtain capacitance detection data depending on capacitances of a plurality of sense electrodes in a liquid crystal display panel. The semiconductor device further comprises processing circuitry configured to generate touch sensing data associated with a current touch sensing frame, based on capacitance detection data associated with the current touch sensing frame and capacitance detection data associated with a former touch sensing frame selected in response to a state in which the liquid crystal display panel is placed in the current touch sensing frame.

The semiconductor device thus configured is suitably used in a display device including a liquid crystal display device.

In another embodiment, a display device comprises a liquid crystal display panel including a plurality of pixel circuits and a plurality of sense electrodes, and display driver circuitry configured to drive the plurality of pixel circuits. The display device further comprises touch controller circuitry configured to obtain capacitance detection data depending on capacitances of the plurality of sense electrodes. The touch controller circuitry is further configured to generate touch sensing data associated with a current touch sensing frame based on capacitance detection data associated with the current touch sensing frame and capacitance detection data associated with a former touch sensing frame selected in response to a state in which the liquid crystal display panel is placed in the current touch sensing frame.

In still another embodiment, a method includes: driving a plurality of pixel circuits of a liquid crystal display panel; obtaining capacitance detection data depending on capacitances of a plurality of sense electrodes of the liquid crystal display panel; and generating touch sensing data associated with a current touch sensing frame, based on capacitance detection data associated with the current touch sensing frame and capacitance detection data associated with a former touch sensing frame selected in response to a state in which the liquid crystal display panel is placed in the current touch sensing frame.

BRIEF DESCRIPTION OF THE DRAWINGS

FIG. 4A illustrates polarity patterns of drive voltages according to one or more embodiments.

FIG. 4B illustrates polarity patterns of drive voltages according to one or more embodiments.

DETAILED DESCRIPTION

Figure 1:
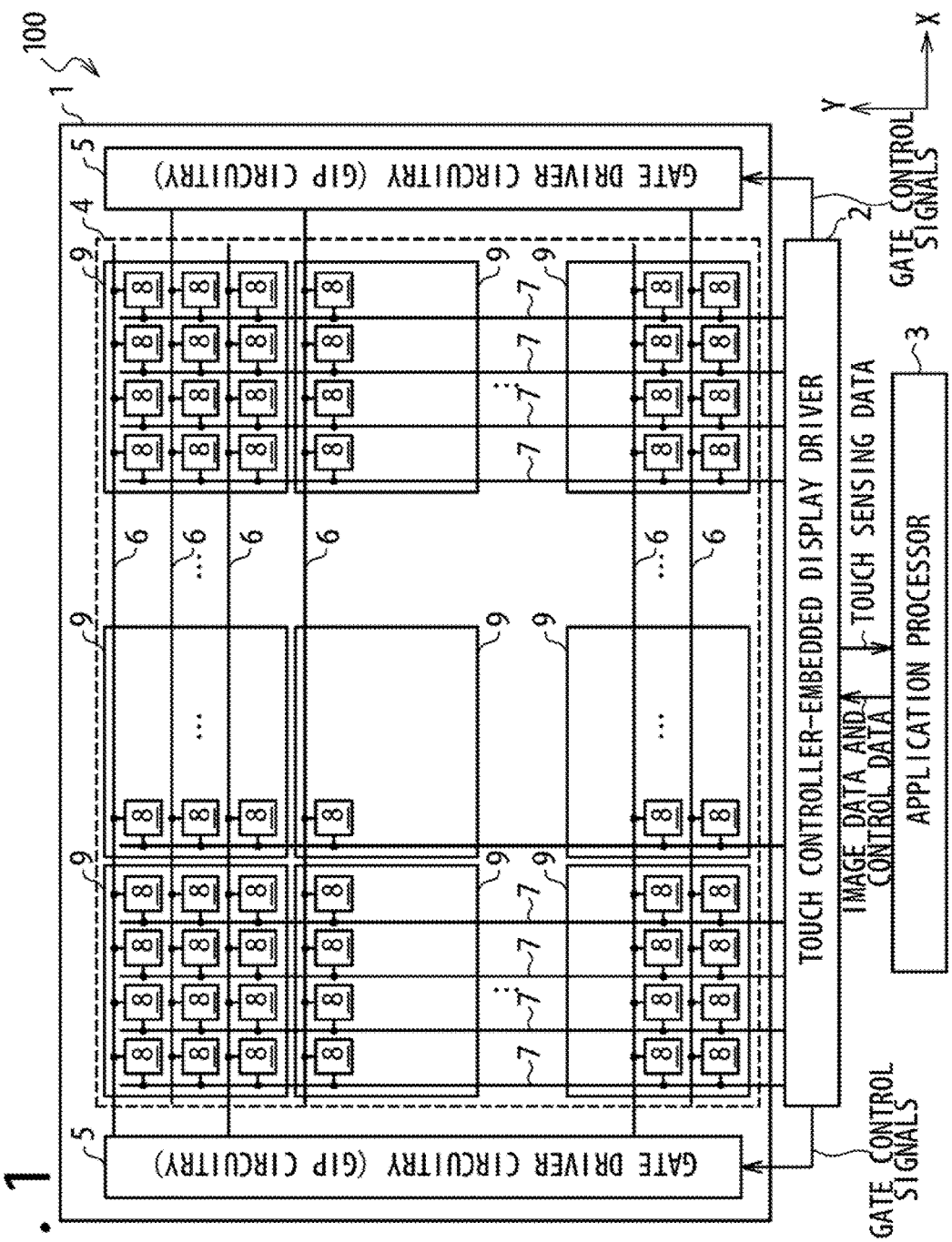
FIG. 1 is a schematic block diagram of a display device according to one or more embodiments.

In the following, a description is given of embodiments with reference to the attached drawings. It should be noted that same or corresponding components may be denoted by same or corresponding reference numerals in the following description.

FIG. 1 is a block diagram schematically illustrating a display device 100 in accordance with some embodiments. In one embodiment, the display device 100 includes an LCD panel 1 and a touch controller-embedded display driver 2. The display device 100 may be configured to receive image data from an application processor 3 and display an image corresponding to the received image data on the LCD panel 1. The display device 100 may be configured to perform touch sensing of user input such as a position at which a conductor, such as a human finger and/or a stylus, is in contact with the LCD panel 1.

The LCD panel 1 may include a display area 4 and gate driver circuitries 5, which are also referred to as gate-in-panel (GIP) circuitries. Arranged in the display area 4 are a plurality of gate lines 6, a plurality of source lines 7 and a plurality of pixel circuits 8. In the embodiment illustrated in FIG. 1, the pixel circuits 8 are arrayed in rows and columns, and each pixel circuit 8 is disposed at an intersection of a corresponding gate line 6 and source line 7. In one embodiment, each pixel circuit 8 may include a selection transistor, a pixel electrode and a hold capacitor. A drive voltage may be applied between the pixel electrode of each pixel circuit 8 and the common electrode provided in the LCD panel 1, and the orientation of liquid crystal filled between the pixel electrode and the common electrode may be controlled by the electric field generated between the pixel electrode and the common electrode.

A row of pixel circuits 8 connected to the same gate line 6 may be collectively referred to as "horizontal line." The pixel circuits 8 may be arranged in the LCD panel 1 to form a plurality of horizontal lines.

The gate driver circuitries 5 drive the gate lines 6 in response to gate control signals received from the touch controller-embedded display driver 2. In the embodiment illustrated in FIG. 1, a pair of gate driver circuitries 5 are disposed on the left and right of the display area 4. The gate driver circuitries 5 may be integrated in the LCD panel 1 with an SOG (system on glass) technique.

In one or more embodiments, sense electrodes 9 used for touch sensing are integrated in the LCD panel 1. In one embodiment where the LCD panel 1 includes a plurality of common electrodes, which may be also referred to as counter electrodes, arrayed in rows and columns, the common electrodes may be also used as the sense electrodes. When self-capacitance touch sensing is performed, the self-capacitances of the sense electrodes 9 may be detected. When mutual capacitance touch sensing is performed, drive electrodes (not illustrated) may be disposed in addition to the sense electrodes 9 and mutual capacitances generated between the sense electrodes 9 and the driver electrodes may be detected. In one embodiment where the LCD panel 1 incorporates a plurality of common electrodes (counter electrodes) arrayed in rows and columns, the common electrodes may be used as drive electrodes.

In one embodiment, the touch controller-embedded display driver 2 is a semiconductor device which operates as follows: First, the touch controller-embedded display driver 2 drives the source lines 7 of the LCD panel 1 in response to image data received from the application processor 3. Second, the touch controller-embedded display driver 2 supplies gate control signals to the gate driver circuitries 5 in response to control data received from the application processor 3 to control the gate driver circuitries 5.

The touch controller-embedded display driver 2 may operate to achieve touch sensing. In one or more embodiments, the touch controller-embedded display driver 2 detects the capacitances of the respective sense electrodes 9 of the LCD panel 1 and senses the position at which a conductor is in contact with the LCD panel 1, on the basis of the detected capacitances of the respective sense electrodes 9. When self-capacitance touch sensing is performed, the touch controller-embedded display driver 2 may detect the self-capacitances of the sense electrodes 9, and sense the position at which a conductor is in contact with or in close proximity to the LCD panel 1, on the basis of the detected self-capacitances. When mutual capacitance touch sensing is performed, the touch controller-embedded display driver 2 may detect the mutual capacitances between the drive electrodes and the sense electrodes 9, and sense the position at which a conductor is in contact with the LCD panel 1, on the basis of the detected mutual capacitances. The touch controller-embedded display driver 2 may generate touch sensing data indicative of the position at which the conductor is in contact with the LCD panel 1 and transmit the generated touch sensing data to the application processor 3.

Figure 2:
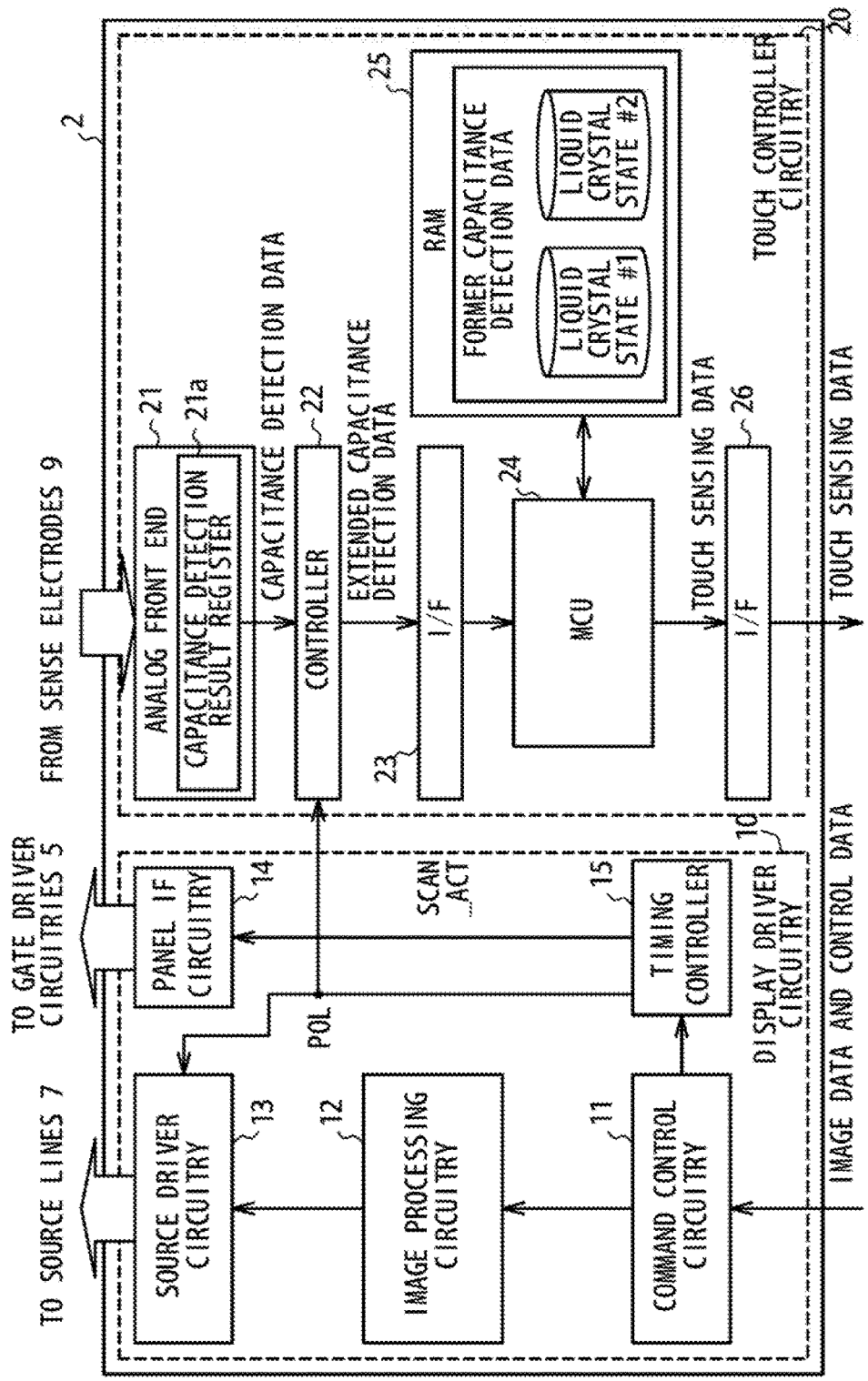
FIG. 2 is a schematic block diagram of a touch controller-embedded display driver according to one or more embodiments.

FIG. 2 is a block diagram illustrating the configuration of the touch controller-embedded display driver 2 according to one or more embodiments. In one embodiment, the touch controller-embedded display driver 2 includes a display driver circuitry 10 and a touch controller circuitry 20. The display driver circuitry 10 and the touch controller circuitry 20 may monolithically be integrated in the same semiconductor chip.

In one embodiment, the display driver circuitry 10 includes a command control circuitry 11, an image processing circuitry 12, a source driver circuitry 13, a panel interface circuitry 14, and a timing controller 15.

The command control circuitry 11 may be configured to receive image data from the application processor 3 and forward the received image data to the image processing circuitry 12. The command control circuitry 11 may be configured to receive control data from the application processor 3 and control the circuitries integrated in the display driver circuitry 10 in response to the received control data.

In some embodiments, the image processing circuitry 12 performs desired image processing, such as gamma correction and image scaling, on the image data received from the command control circuitry 11.

In one embodiment, the source driver circuitry 13 drives the pixel circuits 8 of the LCD panel 1 in response to the image data received from the image processing circuitry 12. When driving pixel circuits 8 of a specific horizontal line, the source driver circuitry 13 may receive image data associated with the horizontal line and generate drive voltages corresponding to the grayscale values described in the image data. The generated drive voltages may be written into the pixel circuits 8 of the horizontal line of interest via the source lines 7, and this achieves driving the pixel circuits 8 of the horizontal line.

In this embodiment, the drive voltage written into each pixel circuit 8 by the source driver circuitry 13 has a polarity. The polarity of a drive voltage may be defined using, as a reference, the common voltage, that is, the voltage supplied to the common electrodes of the LCD panel 1. A drive voltage higher than the common voltage may be referred to as a "positive" drive voltage and a drive voltage lower than the common voltage may be referred to as a "negative" drive voltage. As described later in detail, inversion drive in which the polarities of drive voltages written into the pixel circuits 8 are inverted at predetermined time intervals (e.g., one vertical sync period) may be performed.

In one embodiment, the panel interface circuitry 14 supplies the gate control signals to the gate driver circuitries 5.

The operation of the gate driver circuitries 5 may be controlled on the gate control signals supplied from the panel interface circuitry 14.

In one embodiment, the timing controller 15 performs timing control of the respective circuitries integrated in the display driver circuitry 10 in response to the control data received from the application processor 3.

The timing controller 15 may supply a polarity signal POL to the source driver circuitry 13. The polarity signal POL specifies the polarity pattern of the drive voltages written into the respective pixel circuits 8. In this embodiment, the polarity signal POL is generated as a binary signal having a value of "0" or "1". Drive voltages written into the respective pixel circuits 8 may be inverted in response to the polarity signal POL.

In another embodiment, the timing controller 15 supplies a scan active signal SCAN_ACT to the panel interface circuitry 14. The scan active signal SCAN_ACT selectively enables driving of the gate lines 6 by the gate driver circuitries 5. The gate lines 6 are sequentially driven by the gate driver circuitries 5 in vertical sync periods during which the scan active signal SCAN_ACT is activated. The gate lines 6 are not driven in vertical sync periods during which the scan active signal SCAN_ACT is deactivated.

In one embodiment, the touch controller circuitry 20 includes an analog front end 21, a controller 22, an interface 23, an MCU (micro control unit) 24 and a RAM (random access memory 25) and an interface 26.

The analog front end 21 may be configured to perform analog signal processing for touch sensing. In one embodiment, the analog front end 21 obtains sensing signals from the respective sense electrodes 9 and generates capacitance detection data by performing analog-digital conversion on the sensing signals. The capacitance detection data describe values corresponding to the capacitances of the respective sense electrodes 9. In one embodiment where self-capacitance touch sensing is performed, the capacitance detection data are generated to indicate the self-capacitances of the respective sense electrodes 9. In one embodiment where mutual capacitance touch sensing is performed, the capacitance detection data are generated to indicate the mutual capacitances between the respective sense electrodes 9 and the corresponding drive electrodes. The analog front end 21 may include a capacitance detection result register 21a storing therein the capacitance detection data.

In one embodiment, the controller 22 reads out the capacitance detection data from the capacitance detection result register 21a and generates extended capacitance detection data (which may also be referred to as "liquid crystal state-embedded capacitance detection data") by attaching data indicative of the state of the LCD panel 1 to the capacitance detection data. In the following, the state of the LCD panel 1 may be referred to as "liquid crystal state" and data indicative of the state of the LCD panel 1 may be referred to as "liquid crystal state data". In this embodiment, the extended capacitance detection data are generated by attaching liquid crystal state data indicating the pattern of the polarities of drive voltages written into the respective pixel circuits 8 to the capacitance detection data. In this embodiment, in which the polarity pattern of drive voltages written into the respective pixel circuits 8 is specified by the polarity signal POL, the controller 22 may be configured to receive the polarity signal POL from the display driver circuitry 10, determine the "liquid crystal state" from the polarity signal POL, and generate the extended capacitance detection data by attaching the liquid crystal state data indicating the "liquid crystal state" to the capacitance detection data. In one embodiment, the controller 22 may generate the extended capacitance detection data by attaching the value of the polarity signal POL to the capacitance detection data.

In one embodiment, the interface 23 receives the extended capacitance detection data from the controller 22 and forwards the same to the MCU 24.

The MCU 24 may be configured to receive the extended capacitance detection data from the controller 22 and performs touch sensing calculation on the received extended capacitance detection data. In one embodiment, the MCU 24 stores the extended capacitance detection data received from the controller 22 into the RAM 25. In touch sensing calculation, the MCU 24 may refer to the extended capacitance detection data generated in the current touch sensing frame, that is, the touch sensing frame in which touch sensing is currently performed, and further refer to extended capacitance detection data stored in the RAM 25, which are generated with respect to former touch sensing frames earlier than the current touch sensing frames. In FIG. 2 and other drawings, the extended capacitance detection data generated with respect to the former touch sensing frames and stored in the RAM 25 are referred to as "former capacitance detection data". In one embodiment, the MCU 24 generates touch sensing data indicating the touch sensing result obtained by the touch sensing calculation, which may include the position at which a conductor is in contact with the LCD panel 1, and forwards the same to the interface 26.

The RAM 25 may be used as a work area of touch sensing calculation performed by the MCU 24. RAM 25 may store therein the extended capacitance detection data generated with respect to the former touch sensing frames as described above. In this embodiment, for touch sensing calculation, the extended capacitance detection data generated with respect to former touch sensing frames are read out from the RAM 25.

The interface 26 externally transmits the touch sensing data generated by the MCU 24 to the application processor 3 in this embodiment.

In the following, a further description is given of the operation of the display device 100.

Figure 3:
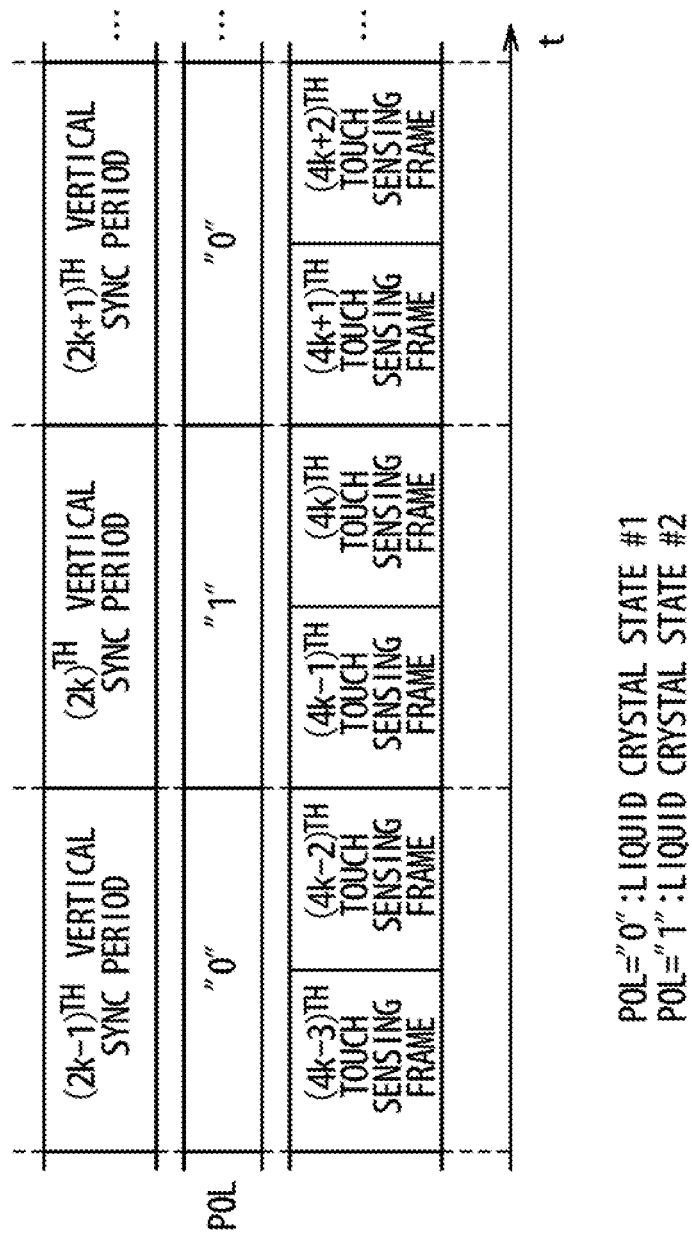
FIG. 3 is a timing chart schematically illustrating an operation of a display device according to one or more embodiments.

FIG. 3 is a timing chart schematically illustrating the operation of the display device 100 according to one or more embodiments. In one embodiment, two touch sensing frames are included in each vertical sync period, during which one frame image is displayed, and touch sensing is performed in each touch sensing frame. In this embodiment, touch sensing is performed twice in each vertical sync period. The number of touch sensing frames included in each vertical sync period may be variously modified.

The polarity signal POL may be inverted with a specific cycle period, for example with a cycle period of two vertical sync periods. In one embodiment, the polarity signal POL has a value of "0" in odd-numbered vertical sync periods and "1" in even-numbered vertical sync periods. The polarity of the drive signal written into each pixel circuit 8 may be inverted with a cycle period of two vertical sync periods (in other words, at the beginning of every vertical sync period).

FIG. 4A illustrates one example of the polarity pattern of drive voltages written into the respective pixel circuits 8 in each vertical sync period. FIG. 4A illustrates the polarity pattern in the case when the LCD panel 1 is driven with a so-called "column inversion drive" technique. The left part of FIG. 4A illustrates the polarity pattern in the vertical sync periods in which the polarity signal has a value of "0" and the right part illustrates the polarity pattern in the vertical sync periods in which the polarity signal has a value of "1".

In the column inversion drive technique, pixel circuits 8 positioned in the same column, that is, pixel circuits 8 connected to the same source line 7, are driven with drive voltages of the same polarity, and pixel circuits 8 positioned in the adjacent columns, that is, pixel circuits 8 connected to adjacent source lines 7, are driven with drive voltages of opposite polarities. In this embodiment, the value of the polarity signal POL is inverted at the beginning of every vertical sync period and the polarities of drive voltages written into the respective pixel circuits 8 are also inverted at the beginning of every vertical sync period.

FIG. 4B illustrates another example of the polarity pattern of drive voltages written into the respective pixel circuits 8 in each vertical sync period. FIG. 4B illustrates the polarity pattern in the case when the LCD panel 1 is driven with a so-called "dot inversion drive" technique. The left part of FIG. 4B illustrates the polarity pattern in the vertical sync periods in which the polarity signal has a value of "0" and the right part illustrates the polarity pattern in the vertical sync periods in which the polarity signal has a value of "1". In the dot inversion drive technique, pixel circuits 8 adjacent in the horizontal direction, which is the direction in which the gate lines 6 are extended, are driven with drive voltages of opposite polarities, and pixel circuits 8 adjacent in the vertical direction, which is the direction in which the source lines 7 are extended, are driven with drive voltages of opposite polarities. The polarity of the drive voltage written into each pixel circuit 8 is also inverted at the beginning of every vertical sync period.

Other inversion drive techniques, such as line inversion drive, may be used although the above disclosure recites the column inversion drive and dot inversion drive as examples of inversion drive.

In one embodiment, the polarity pattern of drive voltages written into the respective pixel circuits 8 in the case when the polarity signal POL is set to "0" is defined as "liquid crystal state #1", and the polarity pattern of drive voltages written into the respective pixel circuits 8 in the case when the polarity signal POL is set to "1" is defined as "liquid crystal state #2".

Referring back to FIG. 3, in one or more embodiments, touch sensing is achieved in each touch sensing frame as described in the following: Sensing signals are obtained from the respective sense electrodes 9 by the analog front end 21 in the current touch sensing frame and capacitance detection data associated with the current touch sensing frame are stored in the capacitance detection result register 21a. The capacitance detection data associated with the current touch sensing frame are forwarded from the capacitance detection result register 21a to the controller 22.

The controller 22 refers to the value of the polarity signal POL in the current touch sensing frame, and generates extended capacitance detection data by attaching data indicating whether the LCD panel 1 is placed in "liquid crystal state #1" or "liquid crystal state #2" in the current touch sensing frame, to the capacitance detection data associated with the current touch sensing frame. In one embodiment, the extended capacitance detection data may be generated by attaching the value of the polarity signal POL in the current touch sensing frame to the capacitance detection data associated with the current touch sensing frame.

The extended capacitance detection data associated with the current touch sensing frame are forwarded to the MCU 24 via the interface 23.

The MCU 24 is a processor configured to calculate a touch sensing result, which may include the position at which a conductor is in contact with the LCD panel, by performing touch sensing calculation on the extended capacitance detection data associated with the current touch sensing frame. The touch sensing calculation in this embodiment involves generating touch response difference information on the basis of comparison between the capacitance detection data associated with the current touch sensing frame and those associated with at least one former touch sensing frame, and calculating the touch sensing result on the basis of the touch response difference information.

The MCU 24 further stores the extended capacitance detection data associated with the current touch sensing frame into the RAM 25. The extended capacitance detection data stored in the RAM 25 are used in touch sensing performed in the subsequent touch sensing frames.

Figure 5A:
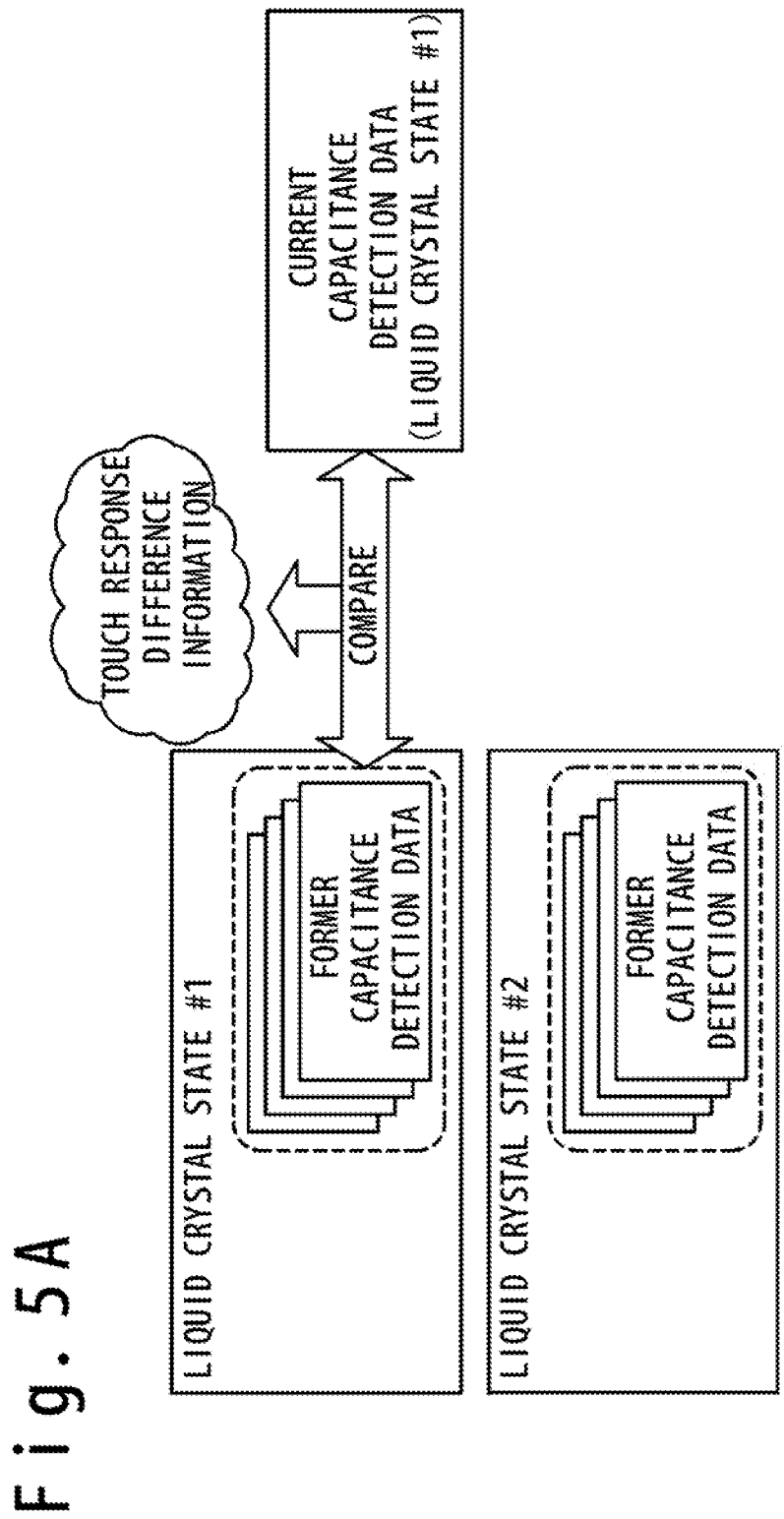
FIG. 5A illustrates touch sensing calculation according to one or more embodiments.
Figure 5B:
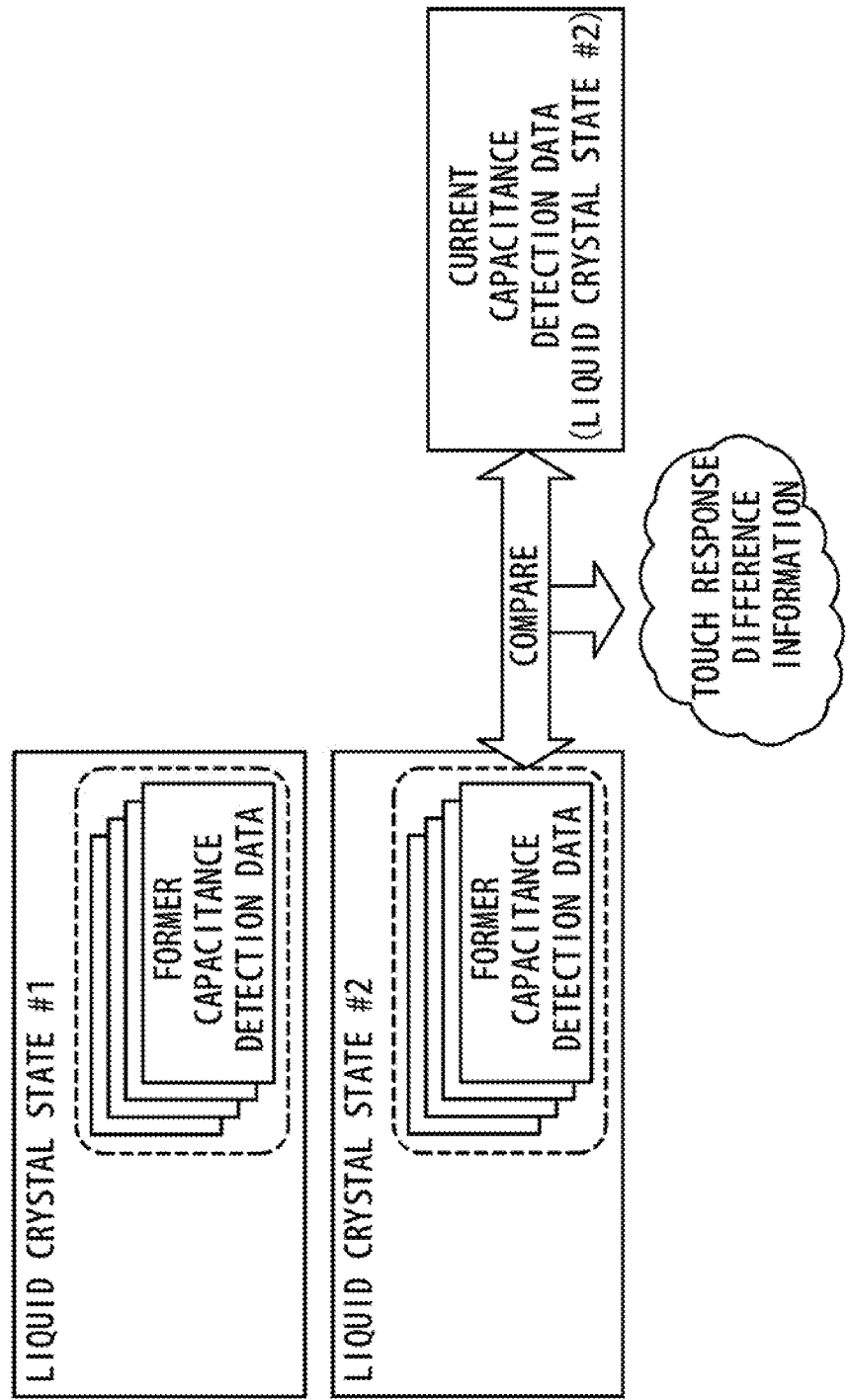
FIG. 5B illustrates touch sensing calculation according to one or more embodiments.

FIGS. 5A and 5B schematically illustrates the touch sensing calculation in this embodiment. In the touch sensing calculation of this embodiment, the capacitance detection data associated with the current touch sensing frame are compared only with the capacitance detection data associated with former touch sensing frames of the same liquid crystal state as that of the current touch sensing frame; the comparison with capacitance detection data associated with former touch sensing frames of the liquid crystal state different from that of the current touch sensing frame is not performed in the touch sensing calculation. As described above, the extended capacitance detection data, to which the liquid crystal state data are added, are stored in the RAM 25. The MCU 24 refers to the liquid crystal state data and selects extended capacitance detection data of former touch sensing frames of the same liquid crystal state as that of the current touch sensing frame, from among the extended capacitance detection data associated with the former touch sensing frames, which are stored in the RAM 25. Additionally, the MCU 24 generates touch response difference information by comparing the capacitance detection data associated with the current touch sensing frame with those included in the selected extended capacitance detection data, that is, the extended capacitance detection data associated with former touch sensing frames of the same liquid crystal state as that of the current touch sensing frame.

More specifically, FIG. 5A illustrates touch sensing calculation for the case when the extended capacitance detection data associated with the current touch sensing frame include liquid crystal state data indicating that the liquid crystal state of the current touch sensing frame is "liquid crystal state #1". In this case, the MCU 24 selects extended capacitance detection data indicating the liquid crystal state #1 from among the extended capacitance detection data associated with former touch sensing frames with reference to the liquid crystal state data included in the extended capacitance detection data, and generates touch response difference information by comparing the capacitance detection data associated with the current touch sensing frame with those included in the selected extended capacitance detection data. The MCU 24 generates touch sensing data associated with the current touch sensing frame from the touch response difference information thus generated.

FIG. 5B, on the other hand, illustrates touch sensing calculation for the case when the extended capacitance detection data associated with the current touch sensing frame include liquid crystal state data indicating that the liquid crystal state of the current touch sensing frame is "liquid crystal state #2". In this case, the MCU 24 selects extended capacitance detection data indicating the liquid crystal state #2 from among the extended capacitance detection data associated with former touch sensing frames with reference to the liquid crystal state data included in the extended capacitance detection data, and generates touch response difference information by comparing the capacitance detection data associated with the current touch sensing frame with those included in the selected extended capacitance detection data. The MCU 24 generates touch sensing data associated with the current touch sensing frame from the touch response difference information thus generated.

As thus described, the touch sensing calculation in this embodiment uses only capacitance detection data associated with former touch sensing frames of the same liquid crystal state as that of the current touch sensing frame in generating the touch sensing data in each touch sensing frame; capacitance detection data associated with former touch sensing frames of the different liquid crystal state are not used. Accordingly, the touch sensing calculation in this embodiment effectively suppresses an influence of changes in the state of the LCD panel 1, in this embodiment, an effect of switching of the polarity pattern of drive voltages supplied to the respective pixel circuits 8, in achieving touch sensing.

Although the above-described embodiments recite that the liquid crystal state, that is, the state of the LCD panel 1, is defined on the basis of the polarity pattern of drive voltages written into the respective pixel circuits 8, a different state of the LCD panel 1 may be defined as one of the allowed liquid crystal states. For example, the state in which the driving and scanning of the gate lines 6 is stopped may be defined as one of the allowed liquid crystal states. It should be noted that the touch controller-embedded display driver 2 illustrated in FIG. 2 is adapted to stop driving and scanning of the gate lines 6 in a desired vertical sync period by deactivating the scan active signal SCAN_ACT.

Figure 6:
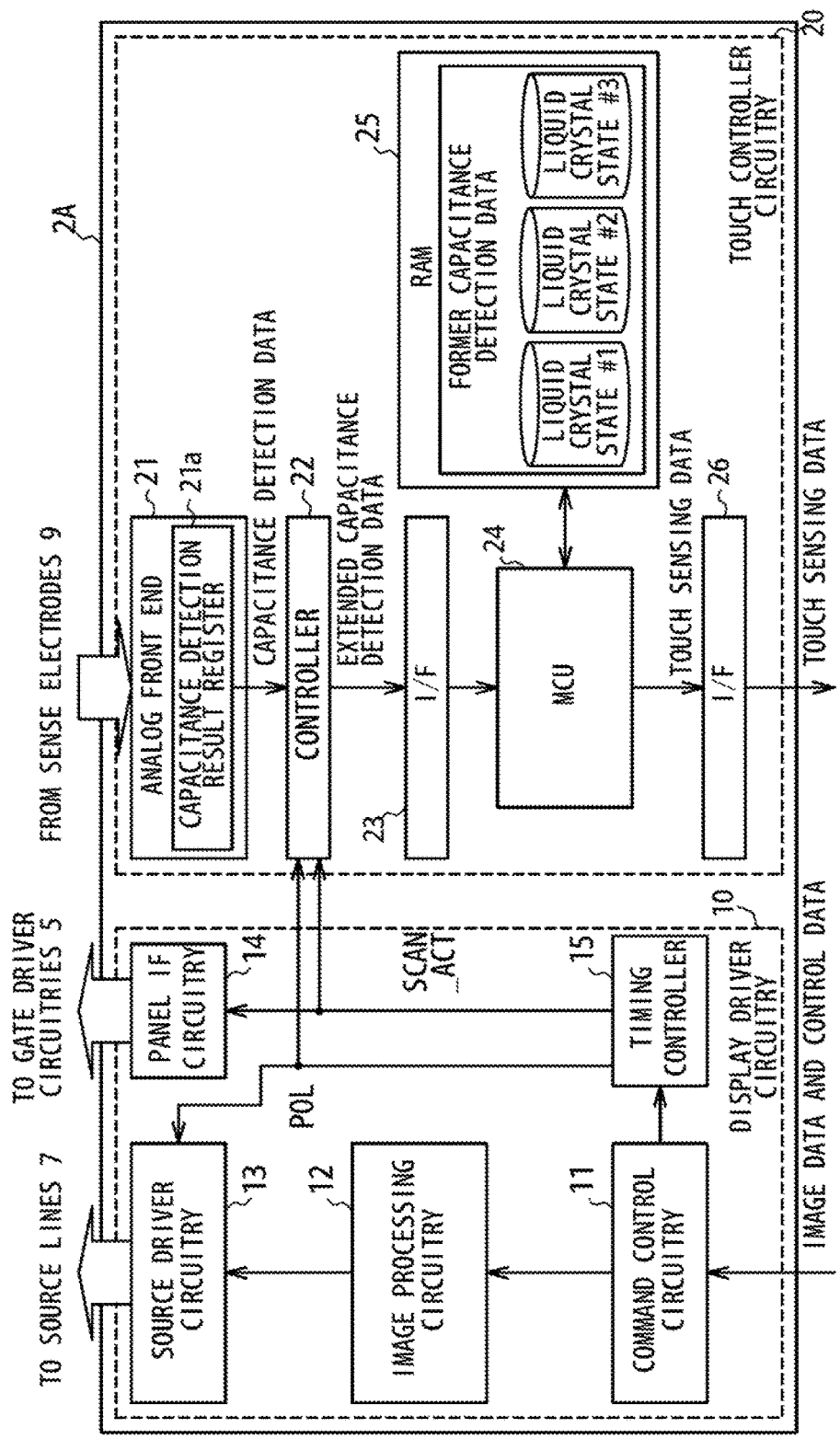
FIG. 6 is a schematic block diagram of a touch controller-embedded display driver according to one or more embodiments.

FIG. 6 is a block diagram illustrating the configuration of a touch controller-embedded display driver 2A configured to define the state in which the driving and scanning of the gate lines 6 is stopped as one of the LCD states according to one or more embodiments. The touch controller-embedded display driver 2A illustrated in FIG. 6 may be configured similarly to the touch controller-embedded display driver 2 illustrated in FIG. 2. A difference is that the touch controller-embedded display driver 2A illustrated in FIG. 6 is configured to supply the scan active signal SCAN_ACT to the controller 22 of the touch controller circuitry 20 from the display driver circuitry 10, in addition to the polarity signal POL. The controller 22 may determine the liquid crystal state on the basis of the polarity signal POL and the scan active signal SCAN_ACT and generate extended capacitance detection data by attaching data indicating the liquid crystal state to the capacitance detection data received from the capacitance detection result register 21a. The controller 22 may generate the extended capacitance detection data by attaching the values of the polarity signal POL and the scan active signal SCAN_ACT to the capacitance detection data.

Figure 7:
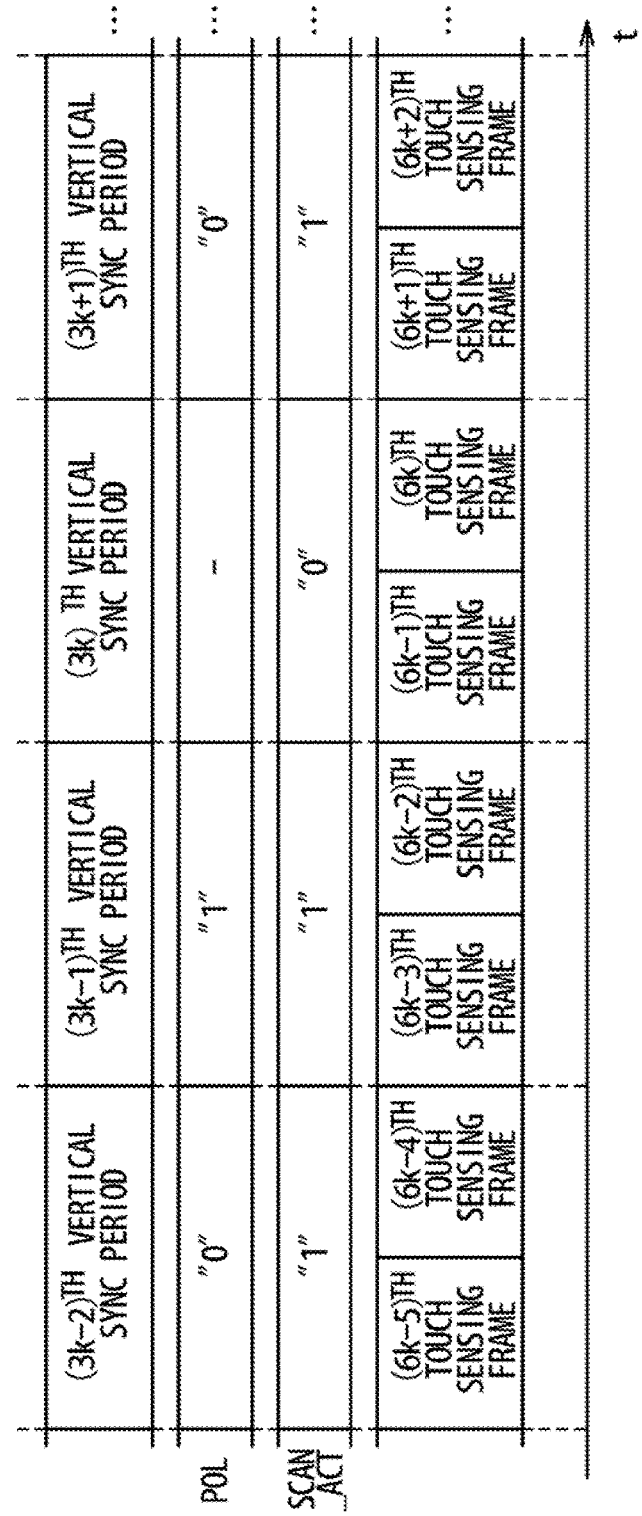
FIG. 7 is a timing chart illustrating an operation of a display device according to one or more embodiments.

FIG. 7 is a timing chart schematically illustrating an example of the operation of the display device 100 including the touch controller-embedded display driver 2A illustrated in FIG. 6 according to one or more embodiments. Also in the operation illustrated in FIG. 7, two touch sensing frames are included in each vertical sync period and touch sensing is performed in each touch sensing frame.

In the operation illustrated in FIG. 7, the scan active signal SCAN_ACT is deactivated (in other words, set to "0") to stop driving and scanning of the gate lines 6 in the $(3k)^{th}$ vertical sync period. In the $(3k-2)^{th}$, $(3k-1)^{th}$ and $(3k+1)^{th}$ vertical sync periods, on the other hand, the scan active signal SCAN_ACT is activated (in other words, set to "1") to drive the gate lines 6. The polarity signal POL is set to "0" in the $(3k-2)^{th}$ and $(3k+1)^{th}$ vertical sync periods, and set to "1" in the $(3k-1)^{th}$ vertical sync period.

In relation to this operation, the liquid crystal state in which the polarity signal POL is set to "0" and the scan active signal SCAN_ACT is set to "1" is defined as "liquid crystal state #1", and the liquid crystal state in which the polarity signal POL is set to "1" and the scan active signal SCAN_ACT is set to "1" is defined as "liquid crystal state #2". Additionally, the liquid crystal state in which the scan active signal SCAN_ACT is set to "0" is defined as "liquid crystal state #3", independently of the polarity signal POL.

Also in the operation illustrated in FIG. 7 according to some embodiments, the capacitance detection data associated with the current touch sensing frame are compared only with the capacitance detection data associated with former touch sensing frames of the same liquid crystal state as that of the current touch sensing frame. As described above, the extended capacitance detection data, to which the liquid crystal state data are added, are stored in the RAM 25, and the MCU 24 selects extended capacitance detection data associated with touch sensing frames of the same liquid crystal state as that of the current touch sensing frame from among the extended capacitance detection data associated with the former touch sensing frames, which are stored in the RAM 25. The MCU 24 generates touch response difference information by comparing the capacitance detection data associated with the current touch sensing frame with those included in the selected extended capacitance detection data.

More specifically, when the extended capacitance detection data associated with the current touch sensing frame include liquid crystal state data indicating that the liquid crystal state in the current touch sensing frame is "liquid crystal state #1", the MCU 24 selects extended capacitance detection data indicating the liquid crystal state #1 from among the extended capacitance detection data associated with former touch sensing frames stored in the RAM 25. The MCU 24 further generates touch response difference information by comparing the capacitance detection data associated with the current touch sensing frame with those included in the selected extended capacitance detection data. The MCU 24 generates touch sensing data associated with the current touch sensing frame from the touch response difference information thus generated.

Similarly, when the extended capacitance detection data associated with the current touch sensing frame include liquid crystal state data indicating that the liquid crystal state in the current touch sensing frame is "liquid crystal state #2", the MCU 24 selects extended capacitance detection data indicating the liquid crystal state #2 from among the extended capacitance detection data associated with former touch sensing frames stored in the RAM 25. The MCU 24 further generates touch response difference information by comparing the capacitance detection data associated with the current touch sensing frame with those included in the selected extended capacitance detection data. The MCU 24 generates touch sensing data associated with the current touch sensing frame from the touch response difference information thus generated.

When the extended capacitance detection data associated with the current touch sensing frame include liquid crystal state data indicating that the liquid crystal state in the current touch sensing frame is "liquid crystal state #3", the MCU 24 selects extended capacitance detection data indicating the liquid crystal state #3 from among the extended capacitance detection data associated with former touch sensing frames stored in the RAM 25. The MCU 24 further generates touch response difference information by comparing the capacitance detection data associated with the current touch sensing frame with those included in the selected extended capacitance detection data. The MCU 24 generates touch sensing data associated with the current touch sensing frame from the touch response difference information thus generated.

Also in this operation, only capacitance detection data associated with former touch sensing frames of the same liquid crystal state as that of the current touch sensing frame may be used in generating touch sensing data in each touch sensing frame, and this effectively suppresses an influence of changes in the state of the LCD panel 1 in achieving touch sensing.

Although embodiments of the present disclosure have been specifically described in the above, a person skilled in the art would appreciate that the technologies disclosed in the present disclosure may be implemented with various modifications.

Figure 8:
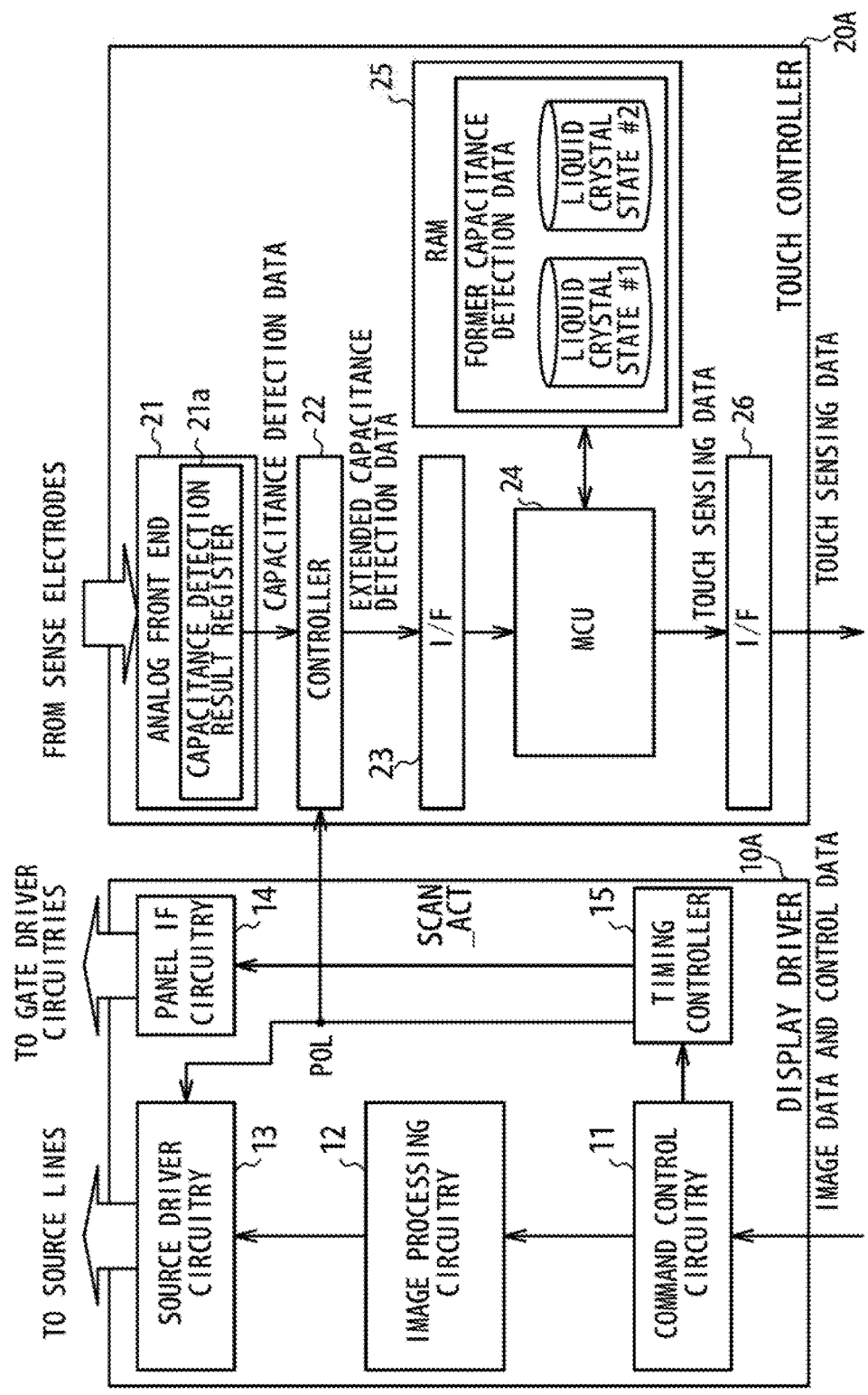
FIG. 8 illustrates a display driver according to one or more embodiments.

For example, although the above-described embodiments recite the touch controller-embedded display drivers 2 and 2A in which the display driver circuitry 10 and the touch controller circuitry 20 are monolithically integrated in the same semiconductor chip, the display driver circuitry 10 and the touch controller circuitry 20 may be integrated in separate semiconductor chips. FIG. 8 illustrates an embodiment in which a display driver 10A having the same function as the display driver circuitry 10 in the above-described embodiments and a touch controller 20A having the same function as the touch controller circuitry 20 in the above-described embodiments are integrated in separate semiconductor chips.

What is claimed is:

1. A semiconductor device, comprising:
an analog front end configured to obtain capacitance detection data depending on capacitances of a plurality of sense electrodes of a liquid crystal display (LCD) panel; and
processing circuitry configured to:
receive first capacitance detection data for a current touch sensing frame;
select, responsive to a display state of the LCD panel during the current touch sensing frame, a former touch sensing frame; and
generate touch sensing data for the current touch sensing frame, based on the first capacitance detection data and on second capacitance detection data for the selected former touch sensing frame.

2. The semiconductor device according to claim 1, further comprising:
display driver circuitry configured to drive a plurality of pixel circuits of the LCD panel.

3. The semiconductor device according to claim 2, wherein the display driver circuitry is further configured to drive the plurality of pixel circuits to place the LCD panel into one of a plurality of display states during a vertical sync period,
wherein the plurality of display states comprise:
a first display state in which, in the vertical sync period, a first pixel circuit of the plurality of pixel circuits is driven with a drive voltage of a first polarity and a second pixel circuit of the plurality of pixel circuits is driven with a drive voltage of a second polarity opposite to the first polarity; and
a second display state in which, in the vertical sync period, the first pixel circuit is driven with a drive voltage of the second polarity and the second pixel circuit is driven with a drive voltage of the first polarity.

4. The semiconductor device according to claim 3, wherein the display driver circuitry is further configured to:
generate a polarity signal to switch the LCD panel between the first display state and the second display state;
supply the polarity signal to the processing circuitry; and
drive the LCD panel in response to the polarity signal.

5. The semiconductor device according to claim 4, wherein generating the touch sensing data comprises:
generating first extended capacitance detection data for the current touch sensing frame, wherein generating the first extended capacitance detection data comprises attaching liquid crystal state data to the first capacitance detection data, wherein the liquid crystal state data is based on the polarity signal, and
storing the first extended capacitance detection data in a storage device.

6. The semiconductor device according to claim 5, wherein generating the touch sensing data further comprises:
selecting second extended capacitance detection data for the selected former touch sensing frame, wherein the second extended capacitance detection data indicates that the former touch sensing frame corresponds to a same liquid crystal state as that of the current touch sensing frame indicated by the liquid crystal state data,
wherein generating the touch sensing data is based on the first capacitance detection data and the second capacitance detection data included in the second extended capacitance detection data.

7. The semiconductor device according to claim 3, wherein the LCD panel further comprises a plurality of gate lines to select rows of the plurality of pixel circuits,
wherein the display driver circuitry is further configured to drive the plurality of gate lines, and
wherein the plurality of display states further comprise a third display state in which the plurality of gate lines are not driven in the vertical sync period.

8. The semiconductor device according to claim 7, wherein the display driver circuitry is further configured to:
generate a scan active signal that selectively enables driving of the plurality of gate lines, and
supply the scan active signal to the processing circuitry.

9. The semiconductor device according to claim 8, wherein generating the touch sensing data comprises:
generating first extended capacitance detection data for the current touch sensing frame, wherein generating the first extended capacitance detection data comprises attaching liquid crystal state data to the first capacitance detection data, wherein the liquid crystal state data is based on the polarity signal and on the scan active signal, and
storing the first extended capacitance detection data in a storage device.

10. The semiconductor device according to claim 9, wherein generating the touch sensing data comprises:
selecting second extended capacitance detection data for the selected former touch sensing frame, wherein the second extended capacitance detection data indicates that the former touch sensing frame corresponds to a same liquid crystal state as that of the current touch sensing frame indicated by the liquid crystal state data,
wherein generating the touch sensing data is based on the first capacitance detection data and the second capacitance detection data included in the second extended capacitance detection data.

11. The semiconductor device according to claim 1, wherein the LCD panel is placed into one of a plurality of display states in each vertical sync period,
wherein the plurality of display states comprise:
a first display state in which, in a relevant vertical sync period, a first pixel circuit of the plurality of pixel circuits is driven with a drive voltage of a first polarity and a second pixel circuit of the plurality of pixel circuits is driven with a drive voltage of a second polarity opposite to the first polarity; and
a second display state in which, in a relevant vertical sync period, the first pixel circuit is driven with a drive voltage of the second polarity and the second pixel circuit is driven with a drive voltage of the first polarity.

12. The semiconductor device according to claim 1, wherein the processing circuitry is further configured to:
externally receive a polarity signal in response to which the LCD panel is switched between the first display state and the second display state; and
generate extended capacitance detection data for each touch sensing frame, wherein generating the extended capacitance detection data comprises attaching liquid crystal state data based on the polarity signal to the capacitance detection data for each touch sensing frame,
wherein the semiconductor device further comprises:
a storage device configured to store therein the extended capacitance detection data.

13. A display device, comprising:
a liquid crystal display (LCD) panel including a plurality of pixel circuits and a plurality of sense electrodes;
display driver circuitry configured to drive the plurality of pixel circuits; and
touch controller circuitry configured to:
obtain capacitance detection data depending on capacitances of the plurality of sense electrodes, wherein the capacitance detection data comprises: first capacitance detection data for a current touch sensing frame, and second capacitance detection data for a former touch sensing frame;
select, responsive to a display state of the LCD panel during the current touch sensing frame, the former touch sensing frame; and
generate touch sensing data for the current touch sensing frame, based on the first capacitance detection data and on the second capacitance detection data for the selected former touch sensing frame.

14. The display device according to claim 13, wherein driving the plurality of pixel circuits comprises placing the LCD panel into one of a plurality of display states during a vertical sync period, and
wherein the plurality of display states comprise:
a first display state in which, in the vertical sync period, a first pixel circuit of the plurality of pixel circuits is driven with a drive voltage of a first polarity and a second pixel circuit of the plurality of pixel circuits is driven with a drive voltage of a second polarity opposite to the first polarity; and
a second display state in which, in the vertical sync period, the first pixel circuit is driven with a drive voltage of the second polarity and the second pixel circuit is driven with a drive voltage of the first polarity.

15. The display device according to claim 14, wherein the display driver circuitry is further configured to:
generate a polarity signal to switch the LCD panel between the first display state and the second display state;
supply the polarity signal to the touch controller circuitry; and
drive the panel in response to the polarity signal.

16. The display device according to claim 15, wherein generating the touch sensing data comprises:
generating first extended capacitance detection data for the current touch sensing, wherein generating the first extended capacitance detection data comprises attaching liquid crystal state data to the first capacitance detection data, wherein the liquid crystal state data is based on the polarity signal, and
storing the generated extended capacitance detection data in a storage device.

17. The display device according to claim 16, wherein generating the touch sensing data further comprises:
selecting second extended capacitance detection data for the selected former touch sensing frame, wherein the second extended capacitance detection data indicates that the former touch sensing frame corresponds to a same liquid crystal state as that of the current touch sensing frame indicated by the liquid crystal state data,
wherein generating the touch sensing data is based on the first capacitance detection data and the second capacitance detection data included in the second extended capacitance detection data.

18. The display device according to claim 14, wherein the LCD panel further comprises a plurality of gate lines to select rows of the plurality of pixel circuits,
wherein the display driver circuitry is further configured to drive the plurality of gate lines, and
wherein the plurality of display states further comprise a third display state in which the plurality of gate lines are not driven in the vertical sync period.

19. A method, comprising:
driving a plurality of pixel circuits of a liquid crystal display (LCD) panel;
obtaining capacitance detection data depending on capacitances of a plurality of sense electrodes of the LCD panel, wherein the capacitance detection data comprises: first capacitance detection data for a current touch sensing frame, and second capacitance detection data for a former touch sensing frame;
selecting, response to a display state of the LCD panel during the current touch sensing frame, the former touch sensing frame; and
generating touch sensing data for the current touch sensing frame, based on the first capacitance detection data and on the second capacitance detection data for the selected former touch sensing frame.

20. The method according to claim 19, wherein driving the plurality of pixel circuits comprises placing the LCD panel into one of a plurality of display states during a vertical sync period,
wherein the plurality of display states comprise:
a first display state in which, in the vertical sync period, a first pixel circuit of the plurality of pixel circuits is driven with a drive voltage of a first polarity and a second pixel circuit of the plurality of pixel circuits is driven with a drive voltage of a second polarity opposite to the first polarity; and
a second display state in which, in the vertical sync period, the first pixel circuit is driven with a drive voltage of the second polarity and the second pixel circuit is driven with a drive voltage of the first polarity.

* * * * *